Dec. 26, 1950     H. C. DRAKE ET AL     2,535,353
RAIL FLAW DETECTOR MECHANISM
Filed Sept. 29, 1949     6 Sheets-Sheet 1

INVENTORS.
HARCOURT C. DRAKE
WALDEMAR I. BENDZ
WILLIAM E. MESH

BY Joseph H. Lipschutz
ATTORNEY.

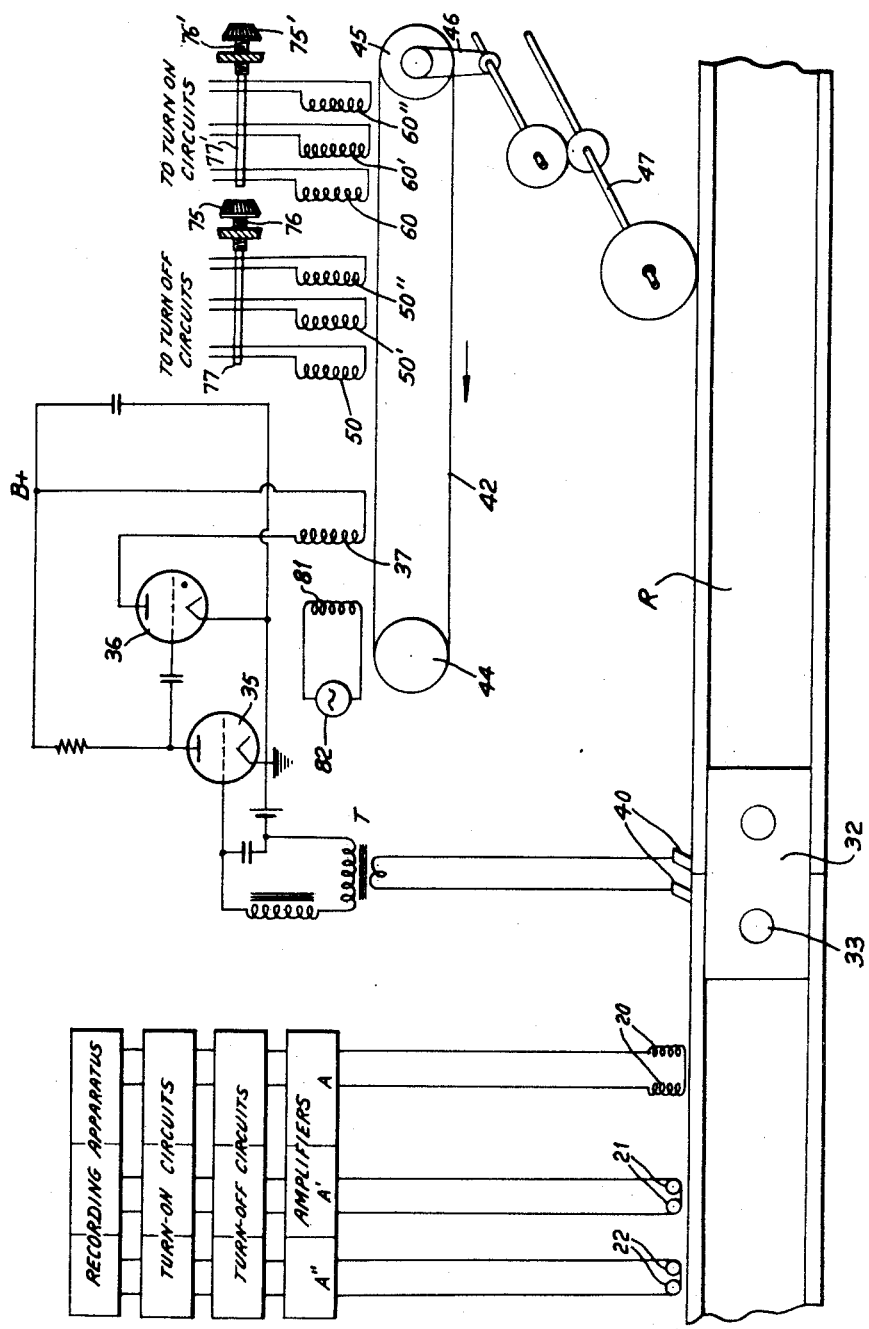

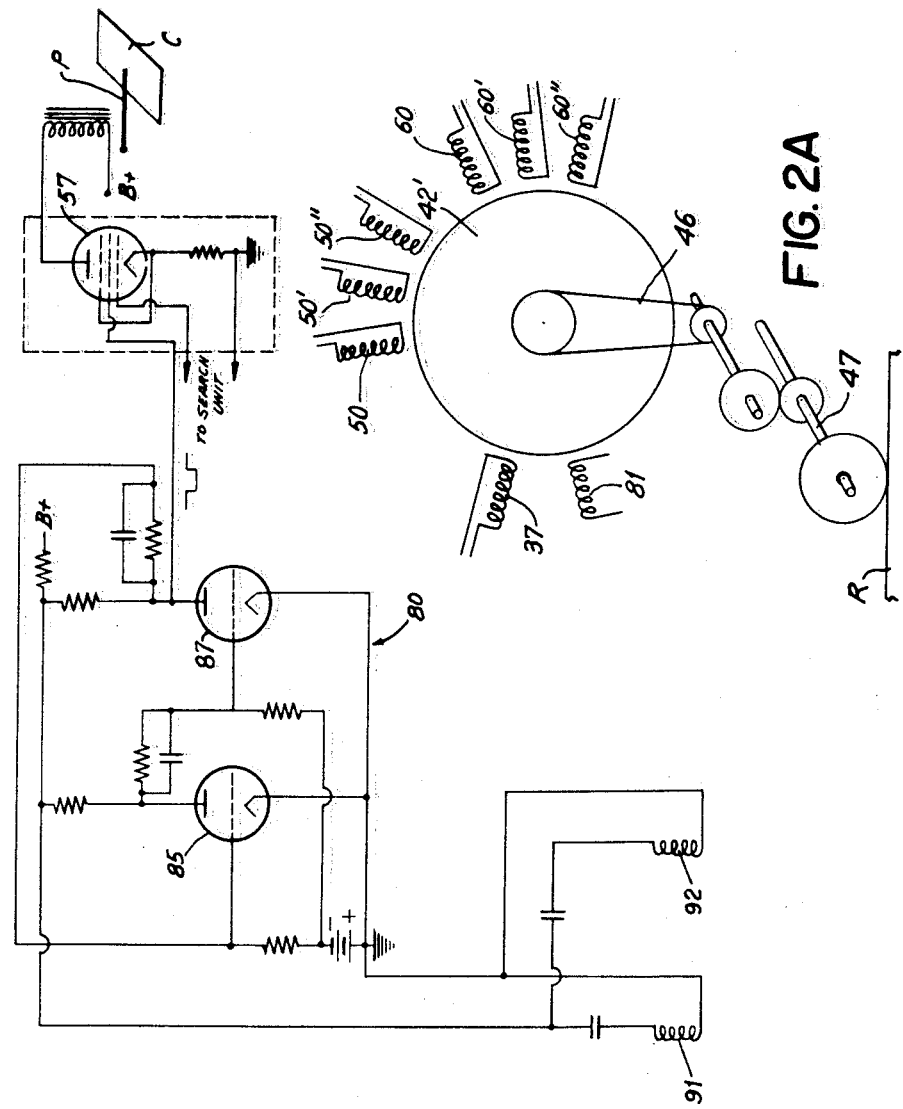

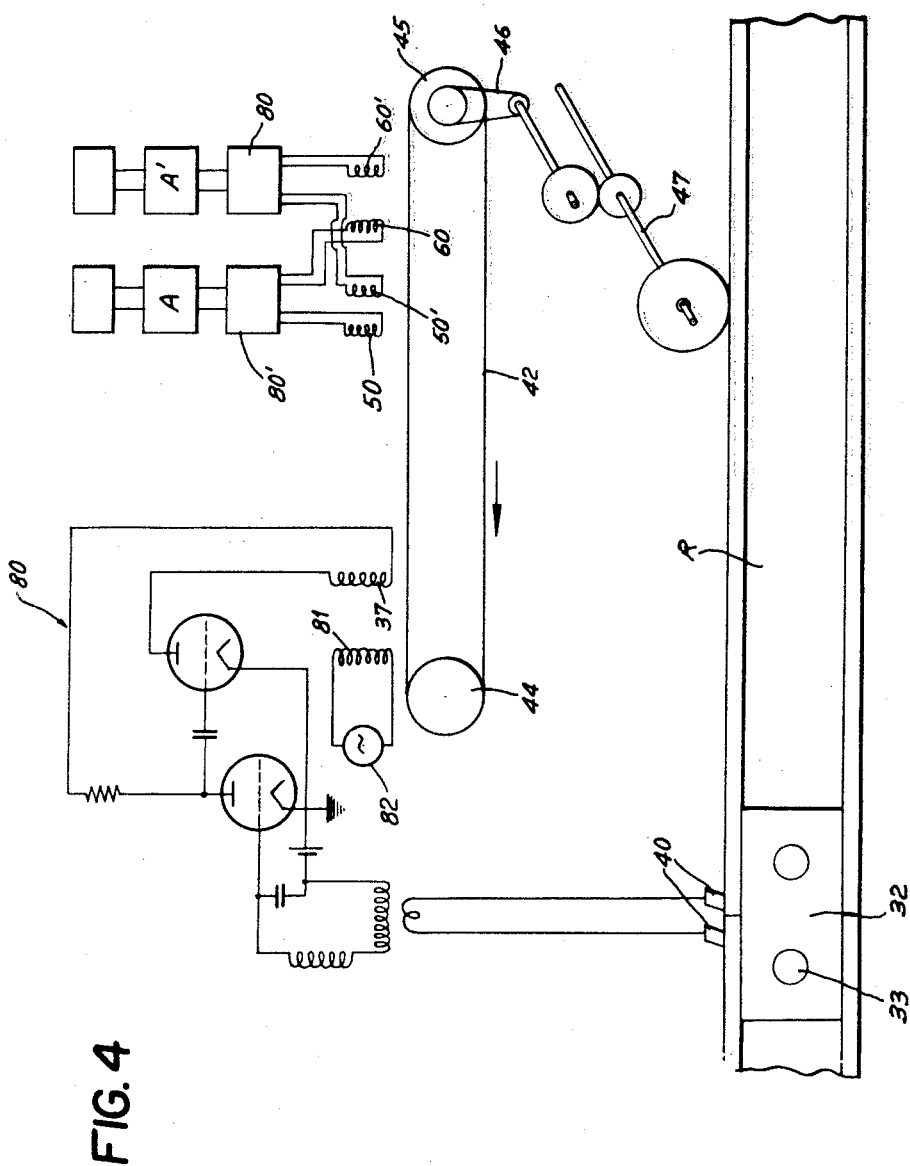

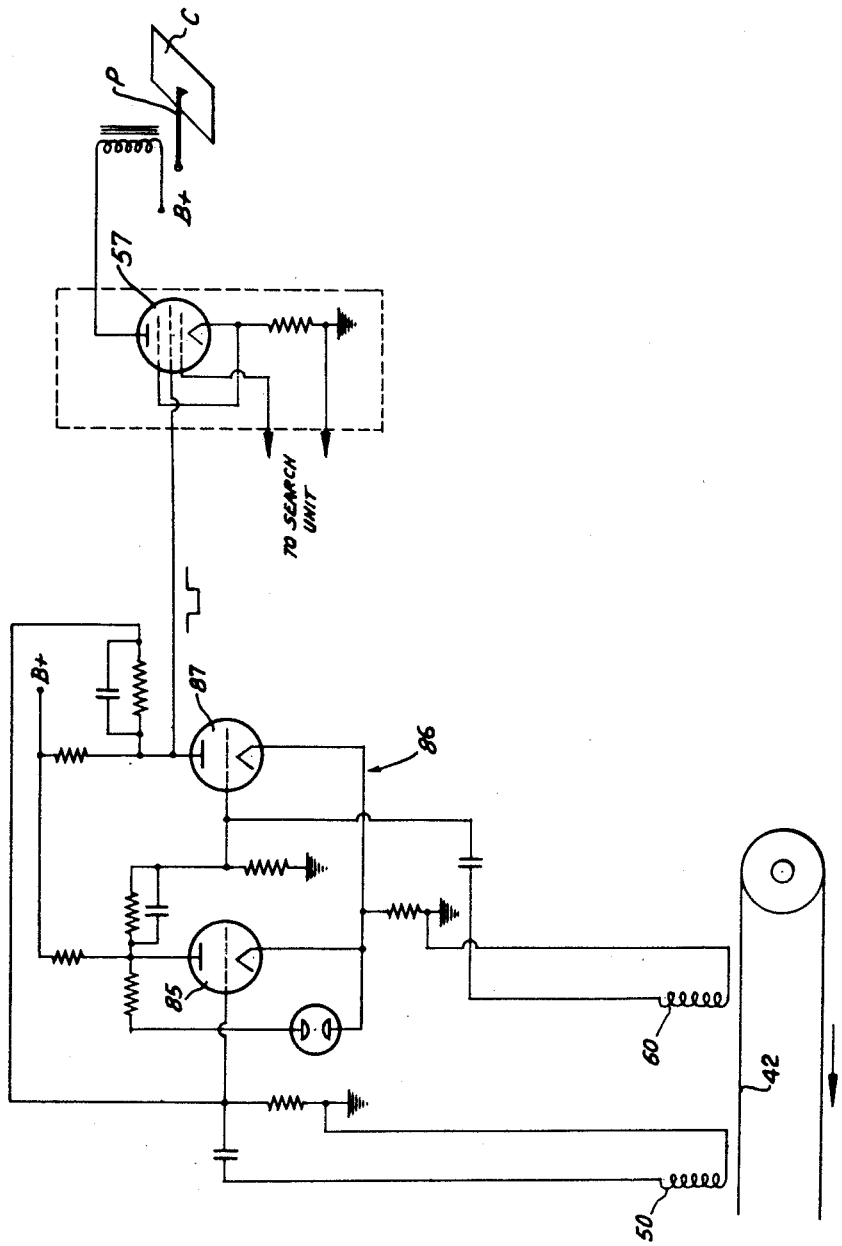

Dec. 26, 1950   H. C. DRAKE ET AL   2,535,353
RAIL FLAW DETECTOR MECHANISM
Filed Sept. 29, 1949   6 Sheets-Sheet 6

INVENTORS.
HARCOURT C. DRAKE
WALDEMAR I. BENDZ
WILLIAM E. MESH

BY
ATTORNEY.

Patented Dec. 26, 1950

2,535,353

UNITED STATES PATENT OFFICE 2,535,353

RAIL FLAW DETECTOR MECHANISM

Harcourt C. Drake, Hempstead, N. Y., and Waldemar I. Bendz, Ridgefield, and William E. Mesh, Brookfield, Conn., assignors to Sperry Products, Inc., Danbury, Conn., a corporation of New York Application September 29, 1949, Serial No. 118,562

21 Claims. (Cl. 175—183)

This invention relates to rail flaw detector mechanisms and is particularly designed for application upon the type of mechanism employed on the Sperry rail flaw detector car. This car operates upon the principle of energizing the rail with flux, as, for instance, by passing current through the rail to establish an electromagnetic field surrounding the same and exploring said field by inductive means to discover any irregularities caused by the presence of fissures or other discontinuities in the rail. The particular problem which presents itself here arises from the fact that rails are joined by angle bars, bolts, etc., which joints constitute in themselves irregularities in the rail which will cause variations in the flux in the same manner as an internal fissure. Therefore, as the detector car rides along the rail, the detector mechanism in passing over a rail joint gives rise to a large number of closely bunched indications on a recording tape, which indications are not distinguishable from one another nor from the indications which may be caused by an internal defect in the rail. It has therefore been the practice to provide cutout means which would cut out the indicating mechanism for a predetermined distance in advance of and after leaving the angle bar so as to prevent actuation of the indicating means throughout the entire region where the electromagnetic flux could be distorted by the angle bar. Such mechanism has heretofore taken the form of either mechanical means such as pivoted fingers designed to engage the angle bar or electric means such as potential contacts which on engagement with the ends of the rail actuated electrical cutout means for cutting out the indicating mechanism.

It is the principal object of this invention to provide cutout means which may be controlled by a magnetic recorder which may take the form of a continuous member comprising magnetic material, such as an endless magnetic tape or wire, or a disc.

It is a further object of this invention to provide a cutout means which maintains fixed relationship to the distance traversed by the car.

It is another object of this invention to provide cutout means of the type described which may be adjusted for various lengths of angle bars.

Further objects and advantages of this invention will become apparent in the following detailed description thereof.

In the accompanying drawings,

Fig. 2 is a diagrammatic representation of one embodiment of the invention.

Fig. 2A is a view similar to a portion of Fig. 2, showing another form of the invention.

Fig. 4 is a view similar to Fig. 2 showing another form of the invention.

Fig. 5 is a detail wiring diagram of the Fig. 4 form of the invention.

Fig. 7 is a detail wiring diagram of the Fig. 6 form of the invention.

Figure 1:
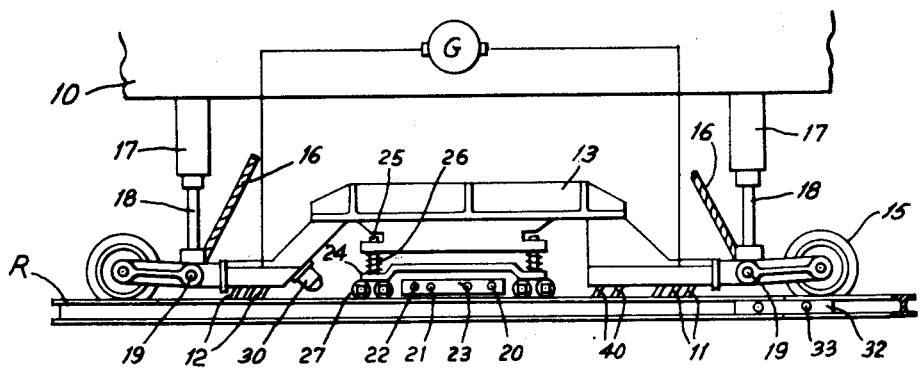
Fig. 1 is a side elevation of a portion of a rail fissure detector car having the invention applied thereto.

Referring to Fig. 1 of the drawings, there are shown parts of a standard Sperry rail fissure detector car which includes a car body 10 operating along the rails R. Fissure detection is accomplished by energizing the rail with flux by passing a current through each rail from a generator G within the car body, supplying current to spaced current brushes 11 and 12 supported upon the current brush carriage 13 which when in lowered or effective position is adapted to ride upon the rail by means such as wheels 15. The current brush carriage 13 is normally held in elevated or ineffective position by means of springs, not shown, and cables 16, but when it is desired to lower said carriage, fluid pressure such as compressed air is supplied to the cylinders 17 to force out piston rods 18 which are pivotally connected at 19 to the current brush carriage 13. The current passed through the rail by way of spaced brushes 11 and 12 will establish an electromagnetic field surrounding the rail and this field will be uniform except in the region of flaw where it will be distorted. Such distortions of the electromagnetic field are detected by a flaw responsive mechanism which may take the form of a plurality of pairs of opposed induction coils 20, 21, 22 supported in a housing 23 at a constant distance above the rail surface by means of a carriage 24. Said carriage 24 is mounted on current brush carriage 13 by means of loosely fitting bolts 25 and springs 26 to permit said carriage 24 while riding on the rail on means such as wheels 27 to move independently of carriage 13 so that the said carriage 24 may at all times maintain parallelism with the rail surface regardless of irregularities thereof. The sets of coils 20, 21, 22 normally cut the same number of lines of force but on entering a region of flaw, first one coil of each pair and then the other will cut a different number of lines of force to generate a differential E. M. F. which after being suitably amplified by amplifiers such as amplifiers A, A', A'' may be caused to actuate recording apparatus such as pens P operating on a chart C. At the same time that the pens are actuated there is actuated also marking means which may take the form of a paint gun 30 mounted on the current brush carriage 13 a sufficient distance behind the flaw responsive members 20, 21, 22 to compensate for the movement of the car and for the lag in operation of the paint gun.

As stated in the introduction hereto the joints which hold the rails together comprise angle bars 32, bolts 33 and additional members, all of which serve to deflect the current passing through the rails and vary the electromagnetic field surrounding the same. The irregularities of the angle bar will cause the detector coils to pick up a large number of variations in the electromagnetic field and this in turn will cause the pens to record upon the chart C a large number of closely bunched indications. Since the current deflection caused by the angle bar commences a considerable distance in advance of the bar and extends its influence for a similar distance beyond the leaving end of the bar, it will be understood that there is a considerable portion of the rail within which it will be difficult to discover any internal defect because any indication of variation in flux caused by the internal defect will be merged with and be indistinguishable from the large number of indications set up by the angle bar within the region affected thereby. It is therefore the practice to provide means for cutting out the indicating means throughout the region of electromagnetic flux affected by the angle bar.

To accomplish the above result there is provided the following mechanism: In advance of the detector housing 23 which supports the detector coils there is provided a pair of joint trip contacts 40 spaced along the rail and which normally measure the potential drop along the rail. The meeting edge of two rails will provide an extraordinarily large potential drop which is applied through an impedance matching transformer T to amplifier tube 35 whose output triggers a thyratron tube 36 which then rapidly energizes a magnetizing or impressor coil 37 of a magnetic recording mechanism. This pulse transmitted by the joint trip amplifier when the contacts 40 pass over the ends of the rails will be impressed by coil 37 on a continuous member comprising magnetic material, such as an endless magnetic wire or tape 42, as shown in Fig. 2 or the periphery of a disc 42' as shown in Fig. 2A. When a wire or tape 42 is used, it passes over pulleys 44 and 45, the latter being driven by belt 46 from the car axle 47 through suitable gearing. Contacts 40 are positioned sufficiently in advance of the housing 23 so that they will engage the rail ends when the first set of coils 20 is a predetermined distance from the region affected by a joint. Therefore after traveling a predetermined length of rail after contacts 40 engage the rail end, the first pair of coils 20 will reach the region affected by the angle bar and therefore will require that the amplifier A which amplifies the output of coils 20 be rendered ineffective to actuate the indicating mechanism. The record impressed by impressor coil 37 on tape 42 in response to the voltage drop across the rail ends will reach a receiver or reproducer pick-up coil 50 after the hereinbefore mentioned predetermined distance has been traversed by coils 20 after contacts 40 engage the rail end.

When coils 20 reach the region of flux affected by the joint the pulse which has been impressed by coil 37 on tape 42 reaches coil 50 which should then operate a turn-off circuit to render the indicator ineffective to be operated by the output of amplifier A in response to pulses generated by coils 20. As soon as coils 20 leave the region of flux affected by the angle bar, the pulse impressed by coil 37 on tape 42 reaches coil 60 which should then operate a turn-on circuit to render the turn-off circuit ineffective and the indicator again effective. Since the member 42 is continuous, the pulse impressed by coil 37 is erased by erasing coil 81 energized by a suitable source of A. C. in advance of impressor coil 37.

Where the periphery of a disc 42' is employed as the continuous member, the periphery is supplied with magnetizable material and the coils 81, 37, 50, 50', 50'', 60, 60' and 60'' are positioned around the periphery. The disc is driven from axle 47 in the same manner as the tape or wire.

Figure 3:
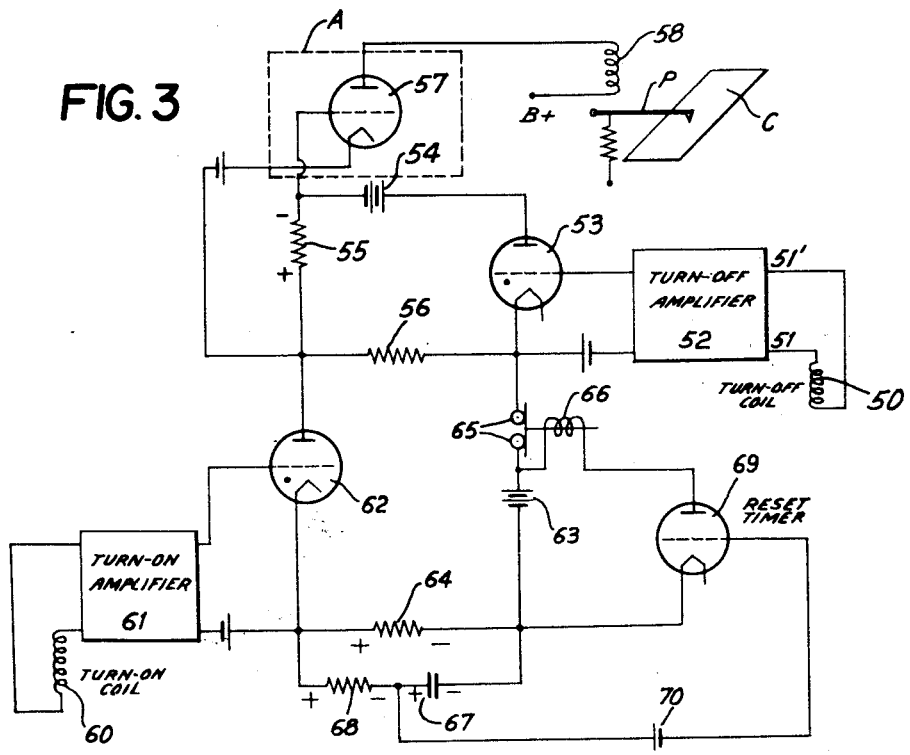
Fig. 3 is a detail wiring diagram of the Fig. 2 form of the invention.

The details of one practical embodiment for accomplishing the above described functions are disclosed in Fig. 3. In the manner previously described, as a magnetized section of tape 42 passes under the first turn-off coil 50 a rise in potential across terminals 51 and 51' is experienced. This change in potential may be amplified by any suitable amplifier 52 whose output is connected to a thyratron tube 53. The anode circuit of tube 53 consists of a suitable source of D. C. potential, illustrated as battery 54 and resistors 55 and 56. The resistor 55 is connected to the grid control circuit of tube 57 which may be the final stage of amplification of amplifier A whose output actuates a relay 58 to attract its armature which may be a pen P operated on the traveling chart C. Thus if tube 57 is rendered non-conducting, the indicating apparatus is likewise rendered inoperative. In the system described, a change in potential across turn-off coil 50 in response to the pulse impressed on tape 42 by coil 37 instantly results in conduction of thyratron tube 53 causing a rise in potential across resistor 55 with the polarity indicated in Fig. 3. The potential across resistor 55 instantly produces a high negative voltage at the grid of final amplifier tube 57 thereby biasing it beyond cutoff and rendering it non-conducting. In this manner the recording apparatus is turned off by the action of thyratron tube 53.

The indicating or recording mechanism actuated by the output of amplifier A should remain ineffective until the coils 20 have passed beyond the region of flux affected by the rail joint. This distance corresponds to the movement of a point on the tape from coil 50 to coil 60. When the pulse impressed by coil 37 reaches coil 60 the indicating mechanism actuated by the output of amplifier A should be rendered again effective. For this purpose the coil 60 actuates turn-on mechanism as follows: Coil 60 is connected to amplifier 61 so that the output of the amplifier fires a thyratron tube 62. The anode circuit of tube 62 consists of a source of D. C. potential which may be battery 63 and resistors 56 and 64. The anode circuit may also include the normally closed contacts 65 of a relay 66. When tube 62 conducts, the potential across resistor 64 instantly develops with the polarity indicated in Fig. 3. Proportions of the circuit constants are made such that the potential thus manifest across resistor 64 as tube 62 becomes conducting is approximately equal to the potential across resistors 55 and 56 combined when tube 53 is conducting. Because of this circuit condition the potential at the anode of tube 53 is approximately zero or negative when tube 62 conducts. Thus tube 53 is immediately extinguished by the firing of tube 62. The previously established potential across resistor 55 immediately reduces to zero and the function of the final amplifier tube 57 is re-established to render the indicating mechanism again effective.

When the turn-on tube 62 fires, the rise in potential across resistor 64 begins to charge capacitor 67 through resistor 68 with the polarity illustrated in Fig. 3, but with the action delayed because of the series connection of resistor 68 and capacitor 67. Reset timer tube 69 is normally biased non-conducting by means of bias potential 70. The slowly rising voltage across capacitor 67 opposes bias voltage 70 so as to permit tube 69 eventually to become conducting. When this condition is satisfied, anode current of tube 69 energizes coils 66 to open contacts 65. This interrupts the anode circuit and flow of current through tube 62. Thus the turn-on tube 62 is reset and the circuit made in readiness for the next signal. Potential across resistor 64 disappears and the circuits of relay timer tube 69 are also reset. It is to be noted that this latter function of timer tube 69 does not bear upon the accuracy of operating either the turn-off or turn-on circuits. Hence, accuracy of the circuits performing the objective of this invention does not depend on the function of timer tube 69.

It will be understood that each pair of coils 20, 21, 22 will be rendered ineffective to actuate its recording mechanism when it reaches the region of flux affected by the joint and will be rendered again effective to actuate its recording mechanism when it has passed beyond the region of flux affected by the joint. Thus just as coils 50 and 60 are positioned to represent the turn-on and turn-off points for coil 20, so coils 50' and 60' are positioned along the tape to represent the turn-off and turn-on points of coil 21 and coils 50" and 60" represent the turn-off and turn-on points for the coils 22. Just as the turn-off and turn-on circuits controlled by coils 50 and 60 affect the amplifier A preferably by rendering the last stage amplifying tube ineffective, so coils 50' and 60' act upon the last stage tube of amplifier A' and coils 50" and 60" act upon the last stage tube of amplifier A" through turn-off and turn-on circuits similar to those described.

It is necessary to provide an adjustment for the distance between the joint trip contacts 40 and the leading pair of coils 20 which distance determines the point at which the cut-out is to begin. This point is usually the point where the rail joint begins seriously to affect the flux surrounding the rail. In order to make this adjustment, the coils 50, 50' and 50" may be actuated as a unit (since their relative positioning is fixed) toward or away from coil 37 which corresponds to the position of contacts 40, by any suitable adjusting device shown diagrammatically as a knurled knob 75 which actuates a threaded screw 76 into and out of a suitable support 77 which supports the three coils. Thus the cut-off point for the recording apparatus may be varied so that the coils 20, 21, 22 may test closer to or further from the angle bar before the recording mechanism is cut out.

A second adjustment is necessary for the length of rail which is cut out. This length is as stated in the introduction hereto usually the length of the angle bar and a predetermined distance at either end of the bar. This cut-out distance is represented by the distance between coils 50, 50', 50" and coils 60, 60', 60" respectively. Therefore, once the coils 50, 50' and 50" have been adjusted with respect to impressor coil 37 which represents the position of the contacts 40 at the joint, the coils 60, 60' and 60" may be adjusted as a unit with respect to the coils 50, 50', 50". For this purpose an adjusting mechanism 75', 76', 77' may be utilized, this mechanism being shown diagrammatcally and being similar to adjusting mechanism 75, 76, 77.

A modified form of the invention is disclosed in Fig. 4 in which a different method is employed for rendering ineffective and effective the recording mechanism controlled by each pair of coils. In this form of the invention instead of the thyratron discharge type of control disclosed in Fig. 3, there is employed a flip-flop circuit which is actuated in one direction for rendering the recording apparatus ineffective and in the opposite direction for rendering the recording apparatus again effective. In this form, as disclosed in Fig. 4 in which similar parts to those in Fig. 2 bear similar numbers, there is again disclosed the impressor coil 37 actuated by the joint trip contacts 40 and there are again employed a plurality of coils 50, 50' whose position relative to coil 37 corresponds to the positioning of coils 20 and 21 relative to contacts 40. Furthermore, there are shown coils 60, 60' whose positioning relative to coils 50, 50' represents the length of rail whose flux variations are not to be recorded. Only two coils 50, 50' and 60, 60' are shown, for the purpose of illustrating the invention, corresponding to coils 20 and 21, but as many coils similar to 50, 60 and 50', 60' may be employed as there are sets of detector coils. Whereas in Fig. 2 coil 50 actuated a gas discharge tube circuit to render the recorder ineffective and another gas discharge tube to render the recorder apparatus again effective, in this form of the invention coil 50, for example, actuates a flip-flop circuit 80 which is actuated in one direction by coil 50 to render the recording mechanism controlled thereby ineffective, and is operated in the opposite direction by coil 60 to render the recording mechanism again effective. Similarly, coils 50' and 60' actuate a second flap-flop circuit 80' to render the recording mechanism controlled thereby ineffective and effective. The specific circuit for accomplishing this result may be as disclosed in Fig. 5.

Fig. 5 shows one well-known type of flip-flop circuit 86 which may accomplish the above-described result. The pulse impressed on the tape 42 by coil 37 generates a voltage in coil 50 when that magnetized portion of the tape passes beneath coil 50.

Assume that the left-hand tube 85 is conducting. The circuit is designed so that only one tube at a time can conduct. A negative pulse from coil 50 is applied to the grid of tube 85. This lowers the grid voltage to a point below cut-off, quenching tube 85. The anode voltage of tube 85 rises toward the B+ voltage. This rise is translated in the circuit to a rise in grid voltage of the right-hand tube 87 to a point above cut-off which allows the tube 87 to conduct. In conducting, the anode voltage of tube 87 drops, lowering the grid voltage of tube 85 to a point below cut-off. Drop in the anode voltage of tube 87 is used to desensitize the amplifier tube 57 by lowering the screen voltage.

It will be understood that the same adjustments of position of coils 50, 50', etc., relative to coil 37 and of coils 60, 60', etc., relative to coils 59, 59', etc., may be made as in Fig. 2.

Figure 6:
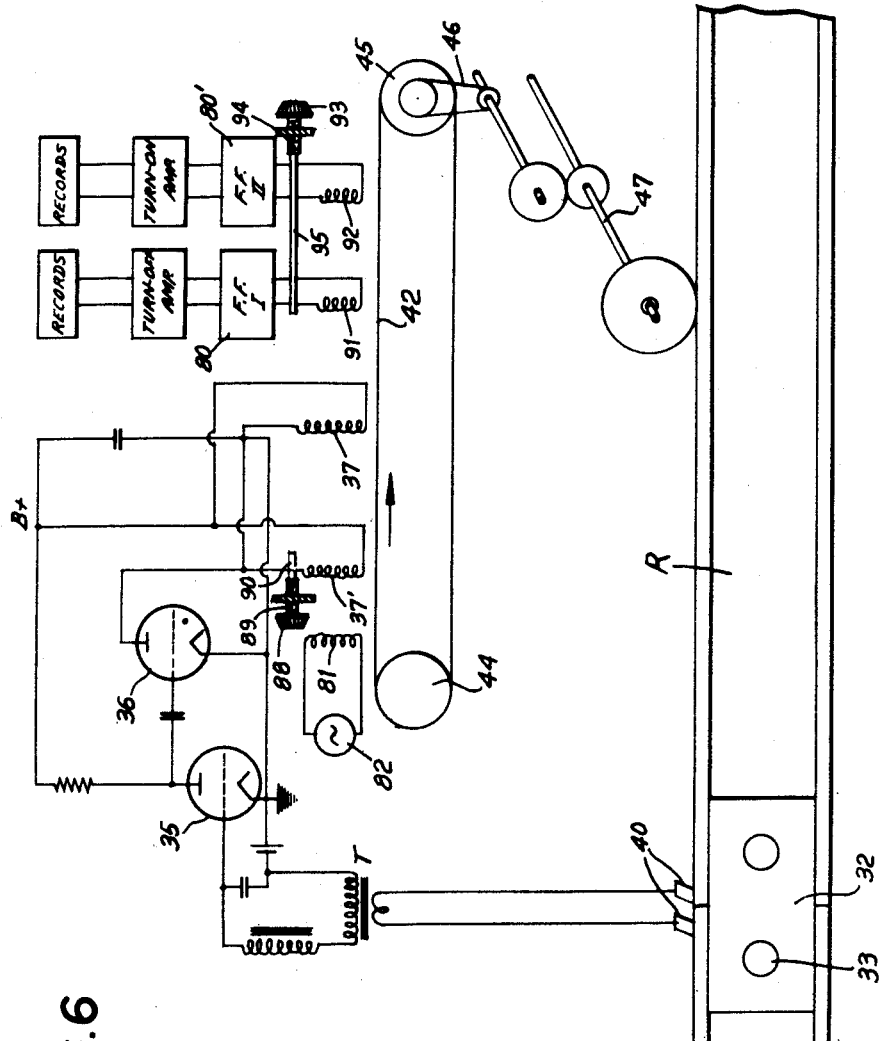
Fig. 6 is a view similar to Fig. 2 showing still another form of the invention.

Still another form of this invention is disclosed in Fig. 6. In this form the engagement of the joint trip contacts 40 with the rail joint causes two coils 37 and 37' to impress two magnetic impressions on the tape 42 simultaneously. The position of coil 37' with respect to coil 37 may be adjusted by any suitable adjustment shown diagrammatically at 88, 89, 90 similar to adjustment 75, 76, 77, so that the distance of 37' from 37 corresponds to the region of flux affected by the rail joint. The flip-flop circuit which is controlled by the impressions on the tape, instead of being actuated by two spaced pick-up coils such as 50, 60, is actuated by a single coil 91 which successively picks up the spaced impressions made by coils 37 and 37'. Thus when the impression made by coil 37 passes beneath coil 91 the flip-flop circuit 80 is actuated to cut off the recording apparatus and when the impression made by coil 37' passes beneath coil 91 the flip-flop circuit 80 is restored to its original condition to permit the recording apparatus to become again effective. Similarly, when the impressions made by coils 37 and 37' pass beneath coil 92 the flip-flop circuit 80' is actuated first in one direction and then in the other to render the recording apparatus controlled by it ineffective and effective respectively. The position of coils 91 and 92 with respect to coil 37 corresponds to the position of coils 20 and 21 with respect to the joint trip contacts 40, and this distance may be adjusted by any suitable adjusting means such as that shown diagrammatically at 93, 94, 95 corresponding to the diagrammatic adjustment shown at 75, 76, 77. Additional coils similar to 91, 92 may be provided for the additional detector coils such as 22. The adjustment 93, 94, 95 may be common to all of the series of coils 91, 92, etc., corresponding to coils 20, 21, etc., because the relative positions of coils 91, 92, etc., are fixed in the same manner as the relative positions of coils 20, 21, etc.

The specific circuit whereby a single coil such as 91 can control the flip-flop circuit 80 to actuate it first in one direction then in the other in response to two spaced impulses on the tape 42 placed thereon by coils 37 and 37' is disclosed in Fig. 7. Assume the left-hand tube 85 is conducting. A negative pulse from coil 91 in response to the impulse impressed by coil 37 is applied to the grids of both tubes 85 and 87 through anode-grid coupling capacitors and lowers the grid voltage of tube 85 to a point below cut-off. The grid of tube 87 is already below cut-off so this tube is not affected. Tube 85 is quenched. The anode voltage of tube 85 rises. This rise is translated in the circuit to a rise in grid voltage of the tube 87 to a point above cut-off voltage, allowing tube 87 to conduct. In conducting, anode voltage of tube 87 drops. This drop in voltage is used to desensitize amplifier tube 57 by lowering the screen voltage. When the impulse impressed by coil 37' passes beneath coil 91 the foregoing action is reversed because the tube 87 is now the conducting tube and there results a rise in anode voltage of tube 87 which again sensitizes amplifier tube 57 by raising the screen voltage.

Having described our invention, what we claim and desire to secure by Letters Patent is:

1. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means adapted to be energized by said pulse to magnetize said member, a receiver for picking up the magnetization of said member caused by the pulse, and means whereby the output of the receiver in response to the magnetization of the member by said pulse renders the indicating means ineffective.

2. A device as specified in claim 1, characterized by the fact that said receiver is spaced from said impressor in the direction of movement of the magnetizable member a distance corresponding to the distance of said flux responsive means from the region of flux affected by the joint when said pulse is generated.

3. A device as specified in claim 1, characterized by a second receiver spaced from the first receiver in the direction of movement of the magnetizable member, and means whereby the output of the second receiver in response to the magnetization of the member by said pulse renders the indicating means again effective after the car has traveled a predetermined distance.

4. A device as specified in claim 1, characterized by the fact that said receiver is spaced from said impressor in the direction of movement of the magnetizable member a distance corresponding to the distance of said flux responsive means from the region of flux affected by the joint when said pulse is generated, a second receiver spaced from the first receiver in the direction of movement of the member, and means whereby the output of the second receiver in response to the magnetization of the member by said pulse renders the indicating means again effective after the car has traveled a predetermined distance.

5. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver including a pick-up adapted to be energized by the magnetization of said member to generate a pulse, said indicating means including an electronic amplifier, and means whereby the output of the receiver in response to the magnetization of the member by the pulse generates a voltage to render the amplifier ineffective.

6. A device as specified in claim 5, characterized by the fact that said receiver is spaced from said impressor in the direction of movement of the magnetizable member a distance corresponding to the distance of said flux responsive means from the region of flux affected by the joint when said pulse is generated.

7. A device as specified in claim 5, characterized by a second receiver spaced from the first receiver in the direction of movement of the magnetizable member, and means whereby the output of the second receiver in response to the magnetization of the member by the pulse generates a voltage to render the amplifier again effective.

8. A device as specified in claim 5, characterized by the fact that said receiver is spaced from said impressor in the direction of movement of the magnetizable member a distance corresponding to the distance of said flux responsive means from the region of flux affected by the joint when said pulse is generated, a second receiver spaced from the first receiver in the direction of movement of the member, and means whereby the output of the second receiver in response to the magnetization of the member by the pulse generates a voltage to render the amplifier again effective.

9. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver for picking up the magnetization of said member caused by the pulse, said indicating means including an electronic amplifier, a flip-flop circuit for controlling said amplifier to render it effective and ineffective, and means whereby the output of the receiver in response to the magnetization of the member by the pulse generates a voltage to energize said flip-flop circuit to apply a paralyzing voltage to said amplifier to render it ineffective.

10. A device as specified in claim 9, characterized by the fact that said receiver is spaced from said impressor in the direction of movement of the magnetizable member a distance corresponding to the distance of said flux responsive means from the region of flux affected by the joint when said pulse is generated.

11. A device as specified in claim 9, characterized by a second receiver spaced from the first receiver in the direction of movement of the magnetizable member, and means whereby the output of the second receiver in response to the magnetization of the member by the pulse generates a voltage to de-energize the flip-flop circuit and render the amplifier again effective.

12. A device as specified in claim 9, characterized by the fact that said receiver is spaced from said impressor in the direction of movement of the magnetizable member a distance corresponding to the distance of said flux responsive means from the region of flux affected by the joint when said pulse is generated, a second receiver spaced from the first receiver in the direction of movement of the member, and means whereby the output of the second receiver in response to the magnetization of the member by the pulse generates a voltage to de-energize the flip-flop circuit and render the amplifier again effective.

13. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, a plurality of impressor means adapted to be energized simultaneously by said pulse to impress a plurality of magnetizations on said member, said impressor means being spaced in the direction of movement of said member, the space between impressor means corresponding to the length of the region of flux affected by a joint, a receiver for successively picking up the magnetizations of the member, means whereby the output of the receiver in response to the first magnetization renders the indicating means ineffective, and means whereby the output of the receiver in response to the second magnetization renders the receiver again effective.

14. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, a plurality of impressor means adapted to be energized simultaneously by said pulse to impress a plurality of magnetizations on said member, said impressor means being spaced in the direction of movement of said member, the space between impressor means corresponding to the length of the region of flux affected by a joint, a receiver for successively picking up the magnetizations of the member, a flip-flop circuit, means whereby the output of the receiver in response to the first magnetization actuates said circuit in one direction, means whereby the actuation of said circuit in said direction renders the indicating means ineffective, means whereby the output of the receiver in response to the second magnetization actuates said circuit in the opposite direction, and means whereby actuation of said circuit in said last-named direction renders the indicating means again effective.

15. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member in the form of an endless circuit, means for driving said member by said car driving means, means whereby said second rail joint responsive means generates an electrical pulse in response to the joint, impressor means adapted to be energized by said pulse to magnetize said member, flux erasing means positioned in advance of the impressor means, a receiver for picking up the magnetization of said member caused by the pulse, and means whereby the output of the receiver in response to the magnetization of the member by said pulse renders the indicating means ineffective.

16. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means adapted to be energized by said pulse to magnetize said member, a receiver for picking up the magnetization of said member caused by the pulse, means whereby the output of the receiver in response to the magnetization of the member by said pulse renders the indicating means ineffective, said receiver being spaced from said impressor in the direction of movement of the magnetizable member a distance corresponding to the distance of said flux responsive means from the region of flux affected by the joint when said pulse is generated, a second receiver spaced from the first receiver in the direction of movement of the member, means whereby the output of the second receiver in response to the magnetization of the member by said pulse renders the indicating means again effective after the car has traveled a predetermined distance, said member being in the form of an endless circuit, and flux erasing means positioned in advance of the impressor means.

17. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver including a pick-up adapted to be energized by the magnetization of said member to generate a pulse, said receiver including a gas discharge tube adapted to be tripped by the pulse generated by the pick-up, said indicating means including an electronic amplifier, and means whereby the tripping of the gas discharge tube renders the indicator amplifier ineffective.

18. In a rail flow detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver including a pick-up adapted to be energized by the magnetization of said member to generate a pulse, said receiver including a gas discharge tube adapted to be tripped by the pulse generated by the pick-up, said indicating means including an electronic amplifier, and means whereby the tripping of the gas discharge tube renders the final amplifying stage of the indicator amplifier ineffective.

19. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver including a pick-up adapted to be energized by the magnetization of said member to generate a pulse, said receiver including a gas discharge tube adapted to be tripped by the pulse generated by the pick-up, said indicating means including an electronic amplifier, means whereby the tripping of the gas discharge tube renders the indicator amplifier ineffective, a second receiver including a pick-up spaced from the first pick-up in the direction of movement of the magnetizable member a distance corresponding to the length of the region of flux affected by the joint, said second receiver including a gas discharge tube adapted to be tripped by the pulse generated by the second pick-up, and means whereby tripping of the second gas discharge tube renders the indicator amplifier again effective.

20. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver including a pick-up adapted to be energized by the magnetization of said member to generate a pulse, said receiver including a gas discharge tube adapted to be tripped by the pulse generated by the pick-up, said indicating means including an electronic amplifier, means whereby the tripping of the gas discharge tube renders the indicator amplifier ineffective, a second receiver including a pick-up spaced from the first pick-up in the direction of movement of the magnetizable member a distance corresponding to the length of the region of flux affected by the joint, said second receiver including a gas discharge tube adapted to be tripped by the pulse generated by the second pick-up, and means whereby tripping of the second gas discharge tube renders the final amplifying stage of the indicator amplifier again effective.

21. In a rail flaw detector car having driving means adapted to move the car over rails connected by joints, said car having means for energizing the rail with flux, means responsive to variations in said flux caused by defects in the rail, indicating means actuated by said flux responsive means, said responsive means responding also to variations in flux caused by the joint, means responsive to the rail joint and positioned in advance of said flux responsive means, a magnetizable member, means for driving said member by said car driving means, means whereby said second rail joint responsive means generates an electrical pulse in response to the joint, impressor means whereby said pulse magnetizes said member, a receiver including a pick-up adapted to be energized by the magnetization of said member to generate a pulse, said receiver including a gas discharge tube adapted to be tripped by the pulse generated by the pick-up, said indicating means including an electronic amplifier, means whereby the tripping of the gas discharge tube renders the indicator amplifier ineffective, a second receiver including a pick-up spaced from the first pick-up in the direction of movement of the magnetizable member a distance corresponding to the length of the region of flux affected by the joint, said second receiver including a gas discharge tube adapted to be tripped by the pulse generated by the second pick-up, means whereby tripping of the second gas discharge tube renders the indicator amplifier again effective, a reset mechanism for the first gas discharge tube, and means whereby discharge of the second gas discharge tube renders said reset mechanism effective.

HARCOURT C. DRAKE.
WALDEMAR I. BENDZ.
WILLIAM E. MESH.

REFERENCES CITED

The following references are of record in the file of this patent:

UNITED STATES PATENTS

| Number | Name | Date |
|---|---|---|
| 2,113,785 | Drake et al. | Apr. 12, 1938 |
| 2,481,858 | Mesh | Sept. 13, 1949 |